(12) United States Patent
Lin et al.

(10) Patent No.: US 7,507,318 B2
(45) Date of Patent: *Mar. 24, 2009

(54) DEVICES USING RESIN WAFERS AND APPLICATIONS THEREOF

(75) Inventors: YuPo J. Lin, Naperville, IL (US); Michael P. Henry, Batavia, IL (US); Seth W. Snyder, Lincolnwood, IL (US); Edward St. Martin, Libertyville, IL (US); Michelle Arora, Woodridge, IL (US); Linda de la Garza, Woodridge, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 488 days.

This patent is subject to a terminal disclaimer.

(21) Appl. No.: 11/082,469

(22) Filed: Mar. 17, 2005

(65) Prior Publication Data
US 2006/0062988 A1 Mar. 23, 2006

Related U.S. Application Data (60) Provisional application No. 60/611,099, filed on Sep. 17, 2004.

(51) Int. Cl.
*C25C 3/00* (2006.01)
(52) U.S. Cl. ................. 204/252; 204/198
(58) Field of Classification Search ........... 204/198, 204/252
See application file for complete search history.

(56) References Cited

U.S. PATENT DOCUMENTS

| 3,248,339 | A | | 4/1966 | Spes et al. |
|---|---|---|---|---|
| 3,984,358 | A | | 10/1976 | Nefedova et al. |
| 5,306,647 | A | * | 4/1994 | Lehmann et al. ............. 438/71 |
| 5,759,373 | A | | 6/1998 | Terada et al. |
| 6,136,412 | A | * | 10/2000 | Spiewak et al. ............. 428/143 |
| 6,495,014 | B1 | | 12/2002 | Datta et al. |
| 6,786,771 | B2 | * | 9/2004 | Gailus ....................... 439/608 |
| 6,797,140 | B2 | | 9/2004 | Lin et al. |
| 6,835,520 | B2 | * | 12/2004 | Bando et al. ........... 430/123.42 |
| 2002/0042451 | A1 | | 4/2002 | Sugaya |
| 2003/0062311 | A1 | | 4/2003 | Yao et al. |
| 2004/0115783 | A1 | | 6/2004 | Arora et al. |
| 2004/0168968 | A1 | | 9/2004 | Chidambaran et al. |

FOREIGN PATENT DOCUMENTS

EP 0659482 A 6/1995
EP 0 680932 A 11/1995

\* cited by examiner

*Primary Examiner*—Alexa Neckel
*Assistant Examiner*—Zulmariam Mendez
(74) *Attorney, Agent, or Firm*—Olson & Cepuritis, Ltd.

(57) ABSTRACT

Devices incorporating a thin wafer of electrically and ionically conductive porous material made by the method of introducing a mixture of a thermoplastic binder and one or more of anion exchange moieties or cation exchange moieties or mixtures thereof and/or one or more of a protein capture resin and an electrically conductive material into a mold. The mixture is subjected to temperatures in the range of from about 60° C. to about 170° C. at pressures in the range of from about 0 to about 500 psig for a time in the range of from about 1 to about 240 minutes to form thin wafers. Devices include electrodeionization and separative bioreactors in the production of organic and amino acids, alcohols or esters for regenerating cofactors in enzymes and microbial cells.

12 Claims, 8 Drawing Sheets

DEVICES USING RESIN WAFERS AND APPLICATIONS THEREOF

Application for U.S. Letters Patent claiming the benefit under Title 35, United States Code §119(e) of U.S. Provisional Application Ser. No. 60/611,099 filed Sep. 17, 2004.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

The present invention relates to new resin wafers for use in a variety of devices such as, electrodeionization, separative bioreactors, in the production of organic acids or amino acids or alcohols or esters or for regenerating cofactors in enzymes or microbial cells as well as useful in enzyme and/or whole cell based biofuel cells for electricity generation during the operation of the biofuel cell.

BACKGROUND OF THE INVENTION

In U.S. Pat. No. 6,495,014, the entire disclosure of which is incorporated by reference, there was described an ion-exchange resin wafer designed for use in an electrodeionization (EDI) process. The ion-exchange resin wafer disclosed in the '014 patent overcame internal fluid leakage problems. The resin wafer technology enabled the application of EDI technology to desalination of chemical products. The '014 patent described a detailed method to fabricate wafers using latex binders through a polymerization process. U.S. patent application publication nos. 2004/0060875, now U.S. Pat. No. 6,797,140 issued Sep. 28, 2004 and 2004/0115783, the disclosures of which are herein incorporated by reference, relate to latex wafers and devices incorporating same. The new resin wafers disclosed herein greatly increase the performance of devices in a variety of applications, as well as new devices and uses.

The wafers using latex binders described in the '014 patent were adequate for their intended purpose but there were problems in the length of time it took to make those wafers due to the setting times for the latex binding material as well as the separation and capture efficiencies in enzymatic bioreactors using these wafers.

Accordingly, there is a need in this art for material which will increase the separation and capture efficiency for enzymatic bioreactors as well as new methods for manufacturing wafers to accommodate commercial production requirements.

In investigating ways to improve wafers of the type described in the '014 patent, it was found that new wafers could be made with improved characteristics more quickly and efficiently than previously by the use of thermoplastic binders such as polyethylene rather than latex and when combined with an electrically conducting material, provided not only improved characteristics with respect to the prior art wafers made with latex binders but also enabled the wafers to be used in new devices.

SUMMARY OF THE INVENTION

Accordingly, it is an object of the present invention to provide a variety of devices, incorporating new thin wafers described in co-pending application entitled Electronically and Ionically Conductive Porous Material And Method For Manufacture of Resin Wafers Therefrom, Ser. No. 11/082,468 filed on even date, the entire disclosure of which is incorporated herein by reference, such as electrodeionization, separative bioreactors, in the production of organic acids or amino acids or alcohols or esters or for regenerating cofactors in enzymes or microbial cells as well as useful in enzyme and/or whole cell based biofuel cells for electricity generation during the operation of the biofuel cell.

Another object of the invention is to provide a device incorporating a plurality of thin wafers of the type previously set forth wherein the thin wafers are positioned between an anode and a cathode forming reaction and product chambers for electrodeionization; or for separative bioreactors; or for the production of organic acids or amino acids or alcohols or esters; or for regenerating cofactors in enzymes or in microbial cells and wherein the thin wafers are positioned as an anode material between an anodic current collector and a cathode in an enzyme and/or whole cell-based biofuel cell for electricity generation during operation of the biofuel cell.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Co-pending application, Ser. No. 11/082468 filed on even date describes a method to immobilize ion-exchange (IX) resin beads with or without other chemical entities or particles to form a composite resin wafer. Other chemical entities or particles that have been included in the resin wafer are: protein binding beads, carbon black or glassy carbon. The ion exchange resins include both anion and cation resin particles and mixtures of the two. The thermoplastic binders include but are not limited to polyethylene polymers. The mixture is placed into a mold and compressed using a compressing die then heated to form a wafer. The ratio of resins is variable as previously taught. In addition during the fabrication, the temperature, pressure, time of fabrication, gas or vapor flow-through rate and/or the amount of material incorporated into the resin wafer can be adjusted. By controlling these conditions or methods of fabrication, the chemical and physical properties of the composite resin wafer can be altered. These properties include durability, porosity, conductivity, chemical specificity and biochemical specificity. The resin wafers of the present invention are useful in an electrodeionization system for water purification, products desalination, single-stage reaction and separation (capture) of charged products, and secondary ion exchange resin catalytic reactions (e.g., esterification). By incorporating protein binding beads such as nickel-charged resins, proteins can be immobilized in the porous resin wafers for enzymatic conversions. Application 20040115783 published on Jun. 17, 2004 describes other protein binding beads than can be incorporated into the wafer to immobilize proteins. They are incorporated in their entirety in this application as reference. By incorporating carbon black or other electric conductive particles, the resin wafer can be useful for integrated ion and electron carrying. Applications of resin wafers with integrated ion and electron carrying capacity include: biofuel cells, catalytic water-splitting for hydrogen production and enzyme/microbial cell cofactor regeneration.

As described in the co-pending application, low and high molecular weight polyethylene polymers with different particle sizes have been used to make the wafers. Molding temperature has been varied from 60-170° C. depending on the grade of polyethylene used in the process. The molding time was in the range of 1 to 240 minutes. Molding pressure was in the range of 0 to 500 psig. The porosities of the wafer are controlled by either steam formed during the heating or by a heated-gasses or vapors flowing through the mold or by including removable additives such as, but not limited to, dry sugar that can be removed from the cured wafer by water or other solvents. The weight percent of polymer binder to total wafer material was preferably in the range of 25%-70% by weight. The amount of water soluble additives such as sugar that are added initially in the mix to control the wafer porosity preferably was in the range of 10-30 volume % of total initial mixed bead material. By including shims in the mold, the thickness of wafer was controlled in the range of 1.0 mm to more than 12 mm.

Varying the mixing ratios of the binding polymers, different functionalities of porous wafers were made. The first kind of wafer (type I) was made with pure ion-exchange (IX) resin beads, either cation or anion or the mixture of cation and anion resin beads. The second kind of wafer (type II) was an immobilized mixture of IX resin beads with protein capture beads charged with Ni-ions. The third kind of wafer (type III) was a mixture of cation resin beads with carbon black or glassy carbon nanoparticles, preferably having an average diameter of less than about 100 nanometer (nm). The fourth kind of wafer (type IV) is an immobilized mixture that contains IX resin beads, carbon nanoparticles and protein capture beads.

In examples of the present invention, IX resin beads used were PFC100E and PFA444 from Purolite with uniform particle size in the range of 400-600 micrometers. The polymer binder used in the wafer was either the ultra-high molecular weight (melting point 145° C.) 100 micrometers polyethylene polymer particles purchased from Aldrich or the low-molecular weight (melting point around 120° C.) 400 or 1000 micrometers polyethylene polymer particles purchased from Alfa-Aesar. The protein binding resin beads were the ®Ni-NTA Superflow (60-160 micrometer particle size) from Qiagen. Carbon black and glassy carbon powder with 10-20 nm size was obtained from Alfa-Aesar. The amount of material (i.e., the beads) used to make a wafer was in the range of 0.7-1.4 g/cm$^3$ of wafer volume.

Figure 1:
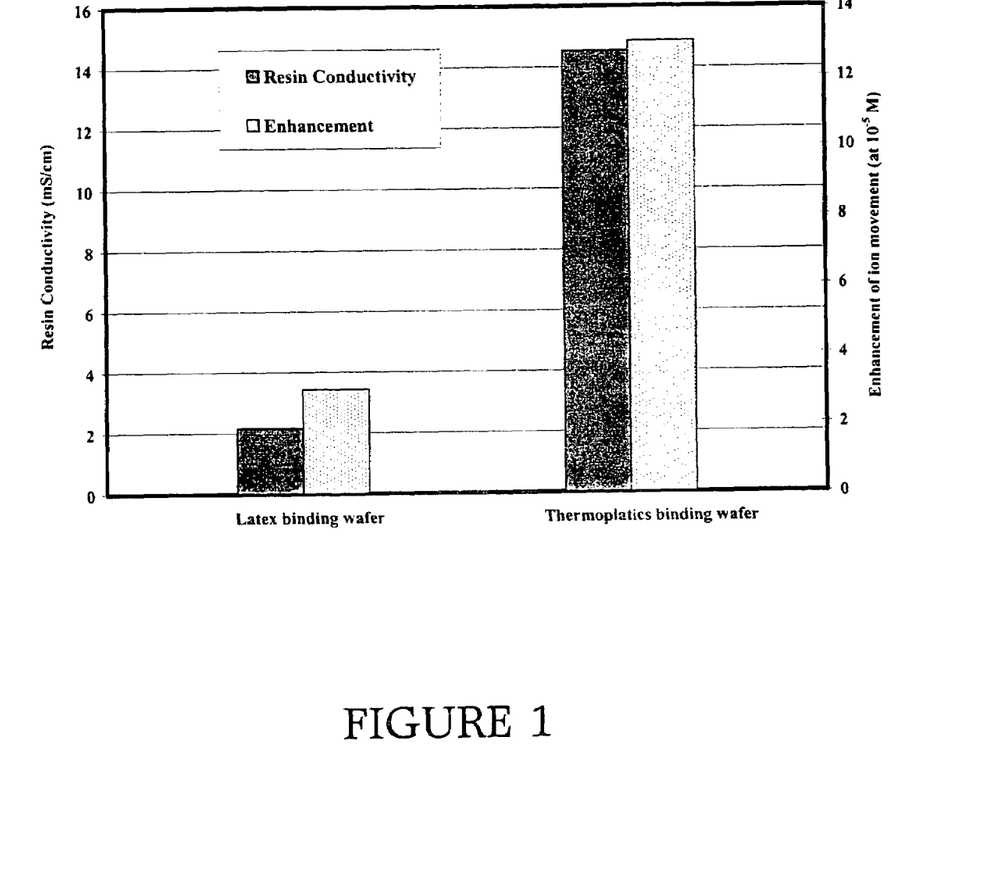
FIG. 1 is a graph showing the comparison of resin conductivities and ion movement in very dilute NaCl solutions ($10^{-5}$ M) for latex and thermoplastic binding wafers.
Figure 2:
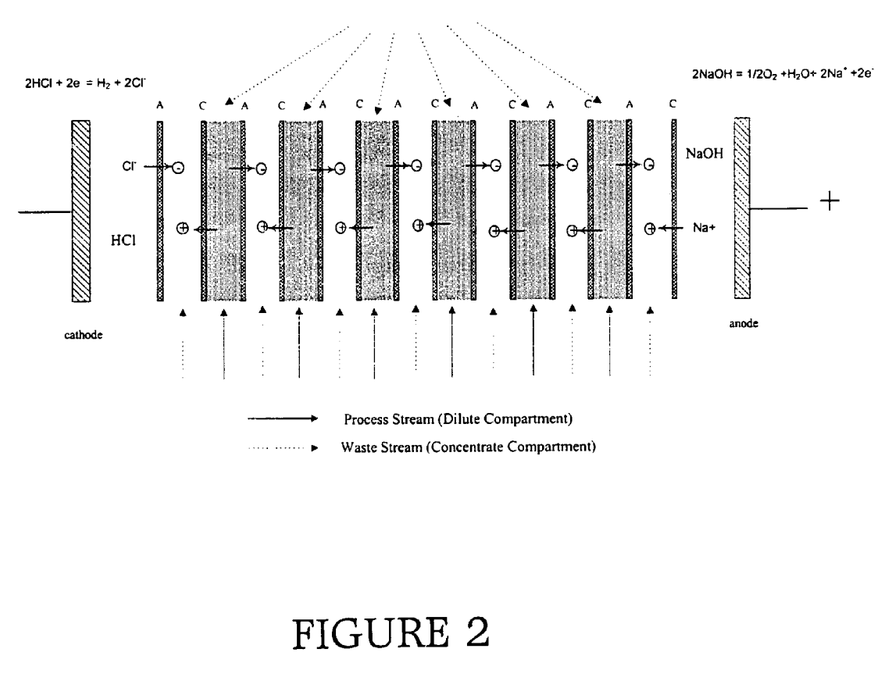
FIG. 2 is a schematic representation of a desalting electrodeionization device of the present invention.

FIG. 1 shows the resin conductivities of type I resin wafers (i.e., contains only ion-exchange resin beads and the polymer binders). The hot-press method, a more detailed disclosure of which is in co-pending application Ser. No. 11/082,468, using thermoplastics exhibits almost 10-fold higher ionic conductivity for the wafer compared to the latex binding method (i.e., using a latex solution). The wafer made by the hot-press method also exhibited significant enhancement in ionic movement in very dilute NaCl solutions (8-fold increase). Porosity in wafers made in accordance with the hot press method was increased to 35% in comparison to 15% in the latex binding wafers. When used in a desalination electrodeionization device such as shown in U.S. Pat. No. 6,495,014, the improved properties of high ionic conductivity and porosity significantly enhances the desalting efficiency. FIG. 2 shows a schematic of desalting electrodeionization (DSED) using the resin wafer. In a DSED, a type I resin wafer is inserted in the dilute compartments which is formed by a pair of cation and anion exchange membranes. The salts in a process stream are fed into the dilute compartment and transferred electrochemically across the membranes into the concentrate compartments, all as is known in the art.

Figure 3:
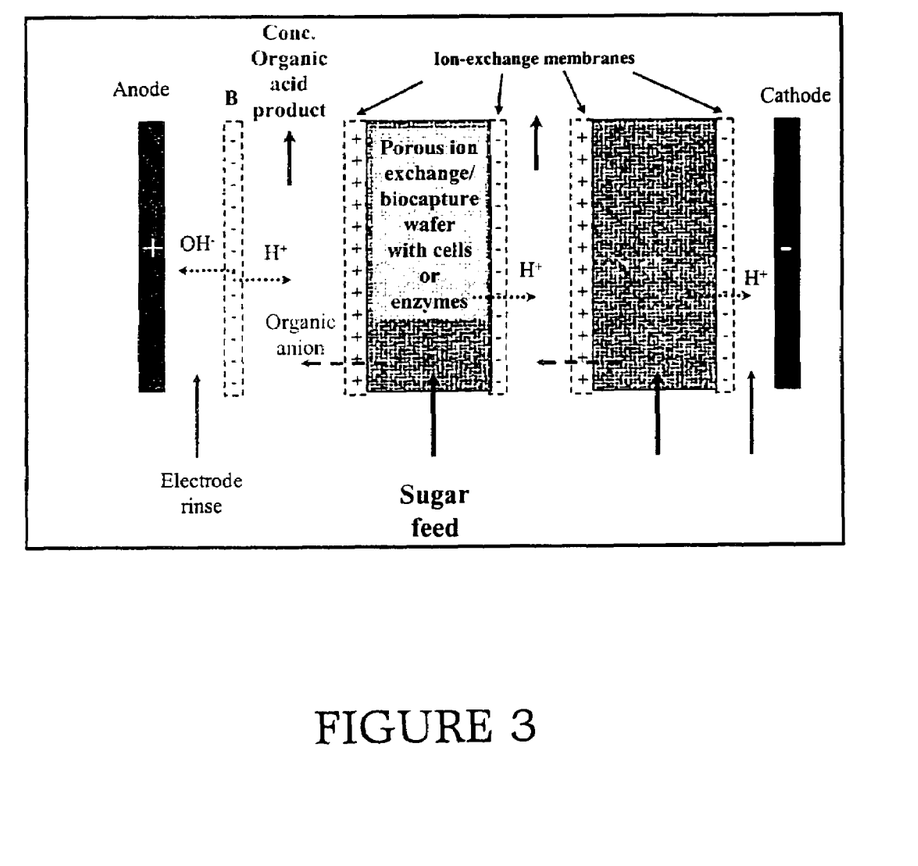
FIG. 3 is a schematic representation of a separative bioreactor for the production of amino acids or alcohols or esters.
Figure 4:
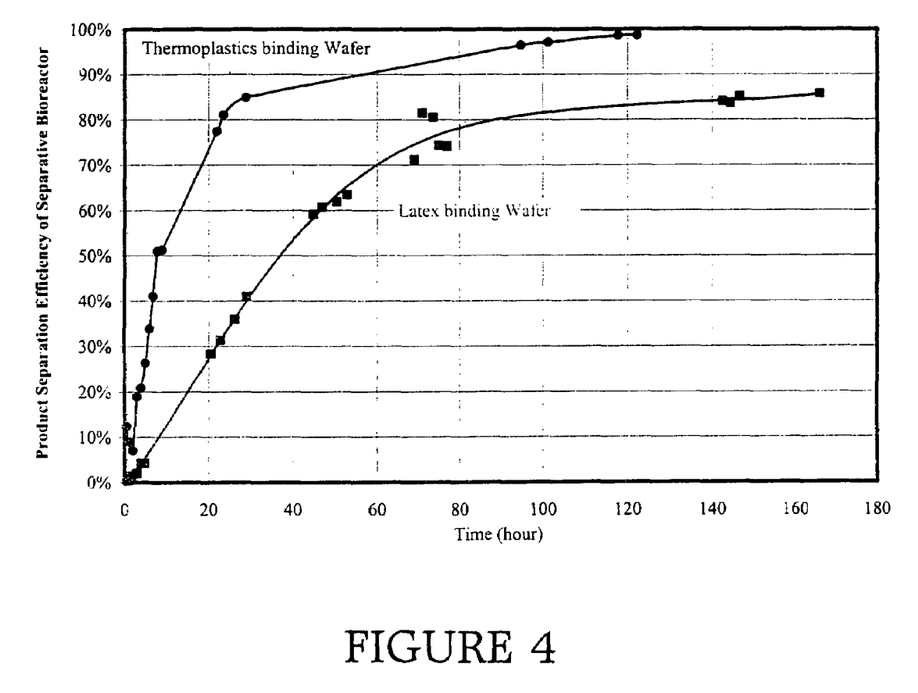
FIG. 4 is a graph showing the separation and capture efficiencies of gluconic acid from inventive enzymatic bioreactors using wafers with a protein binder.

A type II wafer (i.e., contains ion-exchange resin beads and protein binding beads and polymer binders) can be used in an enzymatic bioreactor shown schematically in FIG. 3. FIG. 3 shows an example using glucose-fructose-oxido-reductase (GFOR) enzyme immobilized in the type II resin wafers to produce gluconic acid. Type II resin wafers made from the new wafer fabrication technology significantly improves the separation and capture efficiency of the organic acid products compared with the wafer used in a previous wafer based bioreactor with wafers made in accordance with U.S. Pat. No. 6,979,140. FIG. 4 shows a graphical comparison of capture efficiency for gluconic acid using the latex binding wafer with the new wafer in a Separative Bioreactor. These data indicate that the new method of wafer fabrication enhances the product separations from a biological reaction.

Figure 5:
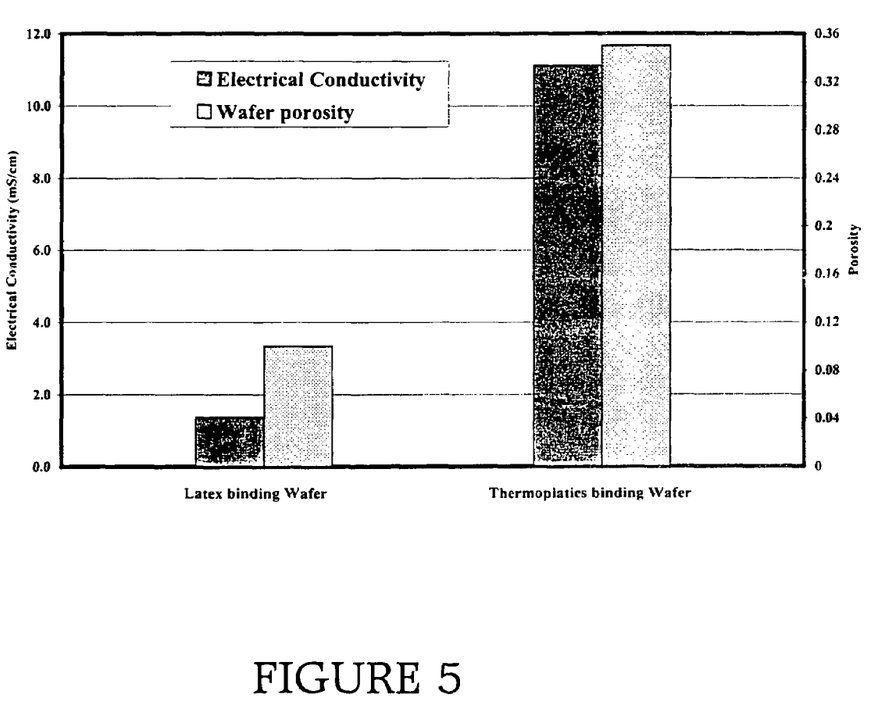
FIG. 5 is a graph showing the relationship between electrical conductivity and porosity for wafers which are a mixture of cation resin beads with carbon black or glassy carbon nanoparticles.
Figure 6:
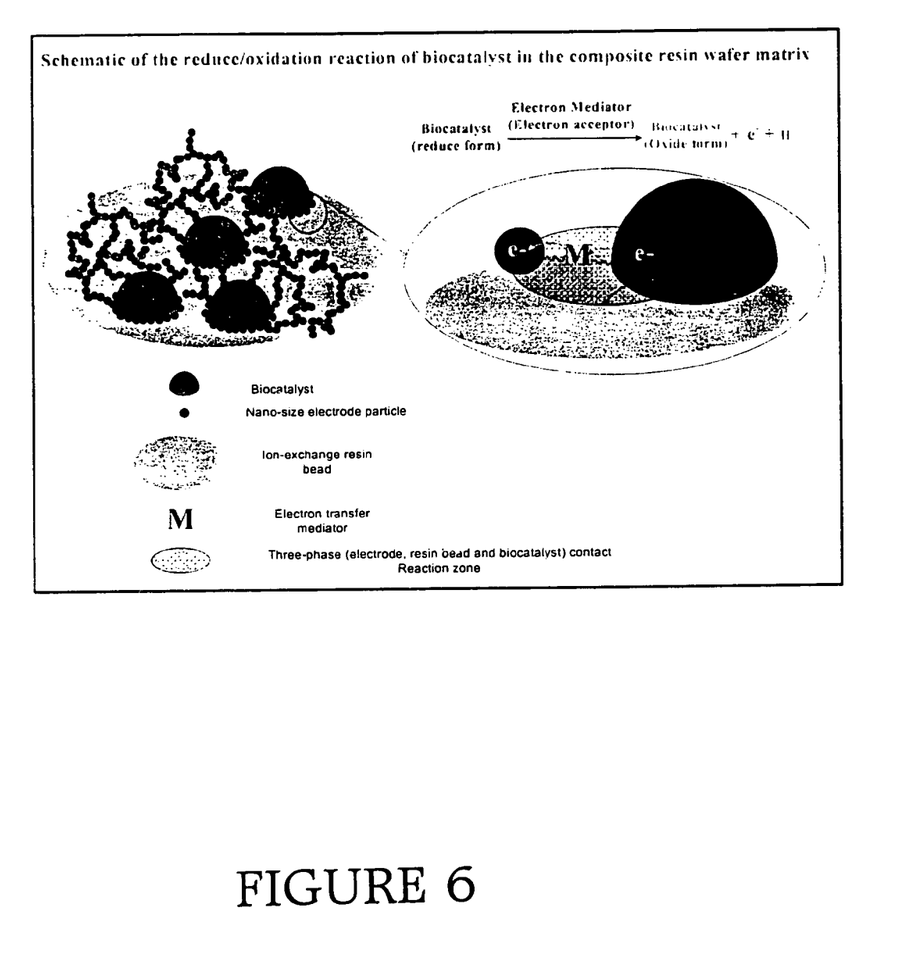
FIG. 6 is a schematic representation of a platform for cofactor regeneration and biofuel cell applications.
Figure 7:
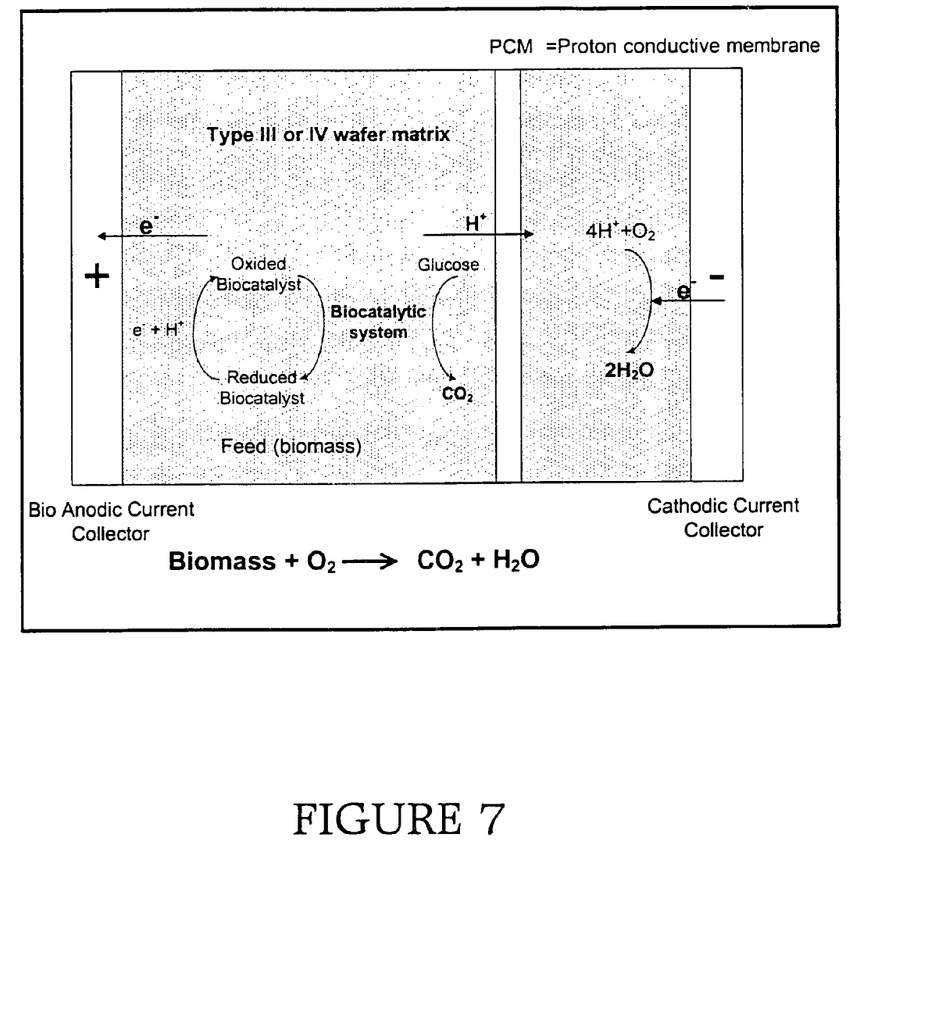
FIG. 7 is a schematic representation of a biofuel cell to generate electricity.
Figure 8:
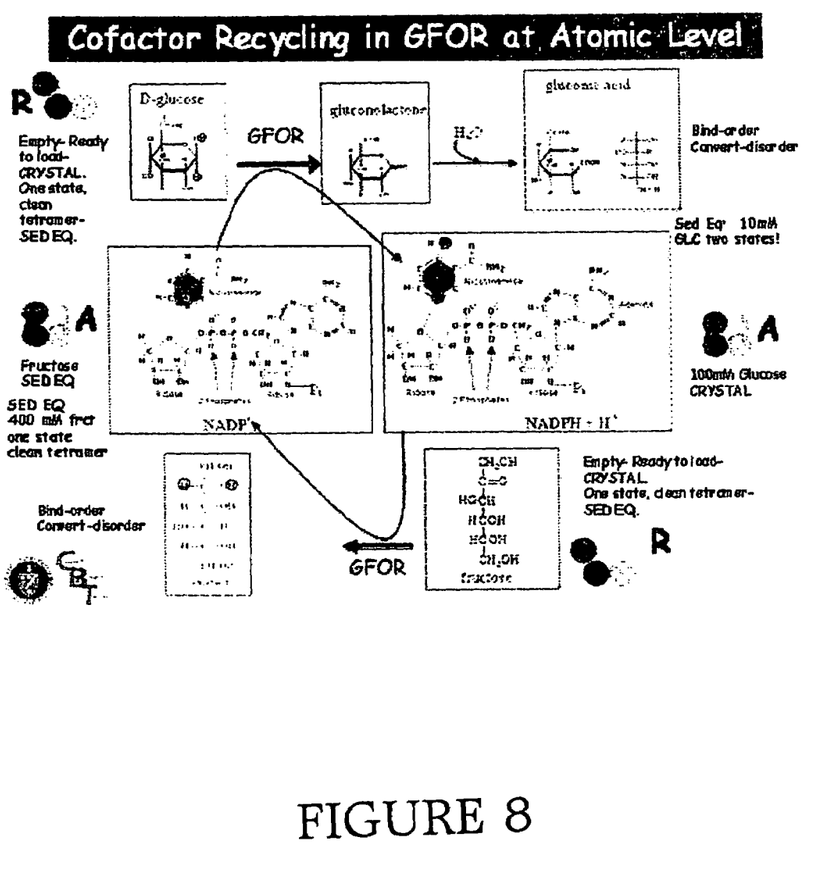
FIG. 8 is representation of a system for cofactor recycling in GFOR.

Type III and IV wafers (i.e., contains carbon black particles, ion-exchange resin beads (type III) and/or protein binding beads (type IV) and the polymer binders) can simultaneously conduct electrons and transport ions. FIG. 5 shows the electrical conductivity and porosity of the new wafer compared to the resin wafer made from latex binding. The new wafer exhibits superior physical properties and performance with a 10-fold increase in electrical conductivity and porosity above 35%. Type III and IV wafers can be used as a platform for the applications of an electrochemical regeneration of enzyme cofactor, see FIG. 8, and biofuel cell, see FIG. 7. The principle of capturing electrons from a biocatalyst using type III or IV wafers is schematically shown in FIG. 6. In a biofuel cell, FIG. 7 (using either enzyme or whole cell as the biocatalysts), the protons and electrons from a bioconversion (bio-anode) are transported away (i.e., in oxidation of the biocatalysts) from the active sites of biocatalysts. The electrons will flow through an external circuit for electricity and the protons will flow inside the solution to the cathode.

As seen therefore, there has been disclosed in the co-pending application an electrically and ionically conductive porous material that includes a thermoplastic binder which is preferably but not necessarily polyethylene and in which the binder is present in the range of from about 25% to about 70% of the weight of the material. The electrically and ionically porous material is preferably in the form of a thin wafer having a thickness in the range of from about 1 to about 12 millimeters and may include anion and/or cation exchange moieties or mixtures thereof in the range of from about 30% to about 75% of the wafer weight. A protein capture resin such as ®Ni-NTA Superflow nickel-charged resins may be present as well as electrically conductive material in the form of nanoparticles preferably having an average diameter of less than about 100 nm. In general, the porous material has a porosity greater than about 15% and up to about 60%. In addition, the wafers may be made by subjecting mixtures of the ion exchange material and the thermoplastic material in a mold to temperatures in the range of from about 60° C. to about 170° C. at pressures in the range of from about 0 to about 500 psig for a time in the range of from about 1 to about 240 minutes to form the thin wafers wherein the thermoplastic binder immobilizes the moieties with respect to each other but does not substantially coat the moieties.

The electrically conductive materials which may be one or more of carbon black or glassy carbon particles or nanoparticles are preferably present in the range of from about 1 to about 15% by weight of the material and in general, the thermoplastic binder preferably has a melting point in the range of from about 100° C. to about 140° C. The thin wafers positioned between an anode and a cathode may form reaction and product chambers for electrodeionization, or for separative bioreactors, or for the production of organic acids or amino acids or alcohols or esters or for regenerating cofactors and ions and enzymes or in microbial cells. When the thin wafers are positioned as an anode material between an anodic current collector and a cathode in an enzyme and/or whole cell based biofuel cell, then electricity is generated during operation of the biofuel cell.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privilege is claimed are defined as follows:

1. A device incorporating a thin wafer not less than about 1 mm in thickness of an electrically and ionically conductive porous material made by the method of introducing into a mold a mixture of (a) a thermoplastic binder,(b) one or more ion exchange moieties selected from the group consisting of an anion exchange moiety, a cation exchange moiety, and mixtures thereof, (c) an electrically conductive material; and optionally, (d) one or more of a protein capture resin, subjecting the mixture to temperatures in the range of from about 60° C. to about 170° C. at pressures in the range of from about 0 to about 500 psig for a time in the range of from about 1 to about 240 minutes to form the thin wafer of electrically and ionically conductive porous material, and removing the thin wafer from the mold; wherein said thermoplastic binder immobilizes the moieties with respect to each other but does not substantially coat the moieties.

2. The device of claim 1, wherein said anion and/or cation exchange moieties are present in the range of from about 30% to about 75% by weight of the material and wherein said thermoplastic binder is present in the range of from about 25% to about 70% by weight of the material and said electrically conductive material is one or more of carbon black or glassy carbon particles or glassy carbon nanoparticles and is present in the range of from about 1 to about 15% by weight of the electrically and ionically conductive flexible and porous material.

3. The device of claim 2, wherein said thermoplastic binder has a melting point in the range of from about 100° C. to about 140° C.

4. The device of claim 3, wherein said thermoplastic polymer is or includes polyethylene and is present in the range of from about 15% to about 60%.

5. The device of claim 4, wherein protein capture resins are present and are Ni-ion-charged resins.

6. The device of claim 1, wherein the wafer thickness is in the range of from about 1 mm to about 12 mm.

7. The device of claim 1, wherein said wafer is flexible when wet and relatively rigid when dry.

8. The device of claim 1, wherein a plurality of said thin wafers are present.

9. A device having an anode and a cathode with a plurality of wafers set forth in claim 8 between said anode and cathode forming reaction and product chambers for electrodeionization; or for separative bioreactors; or for the production of organic acids or amino acids or alcohols or esters.

10. An enzyme and/or whole cell-based biofuel cell for electricity generation during operation of the biofuel cell having a plurality of the thin wafers of claim 8 as anode material between an anode and a cathode.

11. A device for direct cofactor regeneration having an anode current collector and a cathode and anode material of the thin wafers of claim 8 in enzymes or in a microbial bioreactor.

12. A device for direct electrochemical cofactor regeneration having an anode and a cathodic current collector and cathode material of the thin wafers of claim 8 in enzymes or in a microbial bioreactor.

* * * * *